Figure 7:
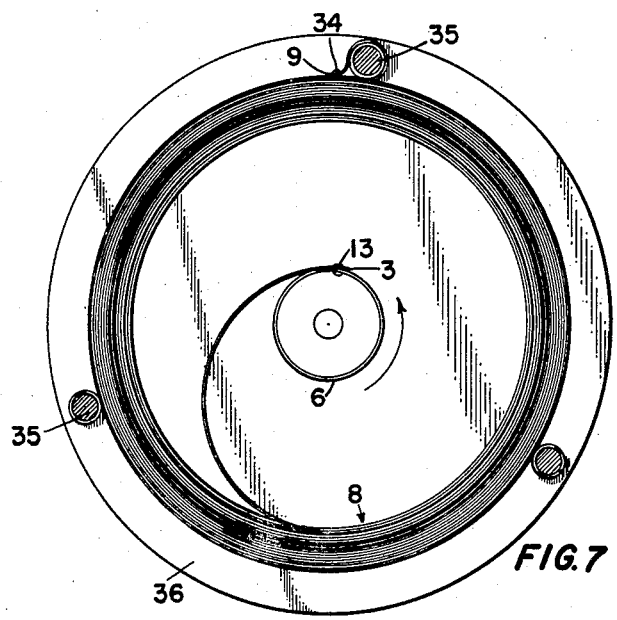

May 6, 1958  E. E. FOSTER  2,833,534
REVERSE WOUND SPRING MOTOR
Filed Jan. 25, 1956  3 Sheets-Sheet 1
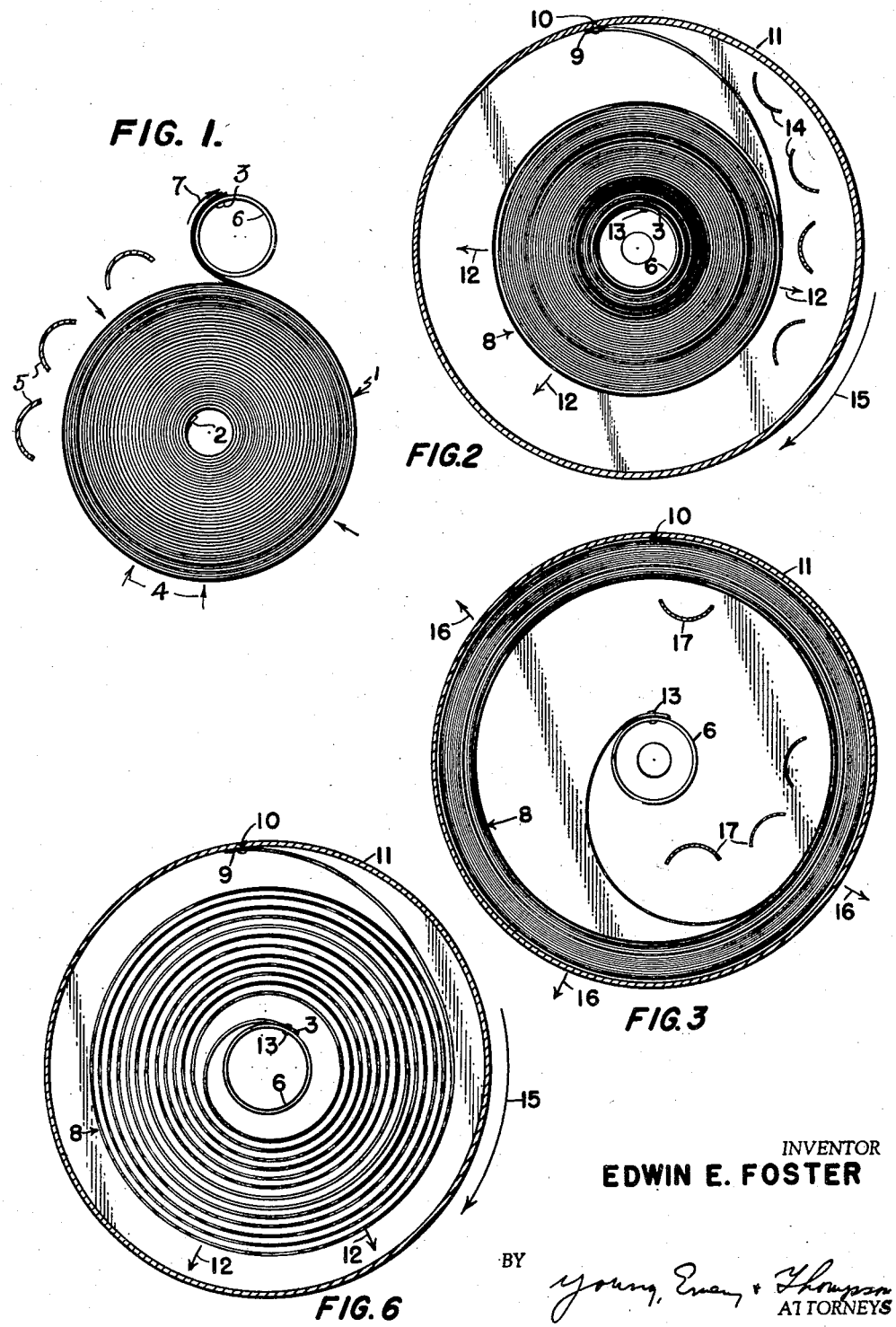
INVENTOR
EDWIN E. FOSTER May 6, 1958  E. E. FOSTER  2,833,534
REVERSE WOUND SPRING MOTOR
Filed Jan. 25, 1956  3 Sheets-Sheet 2

INVENTOR
EDWIN E. FOSTER
BY
Young, Emery & Thompson
ATTORNEYS

May 6, 1958     E. E. FOSTER     2,833,534
REVERSE WOUND SPRING MOTOR
Filed Jan. 25, 1956     3 Sheets—Sheet 3
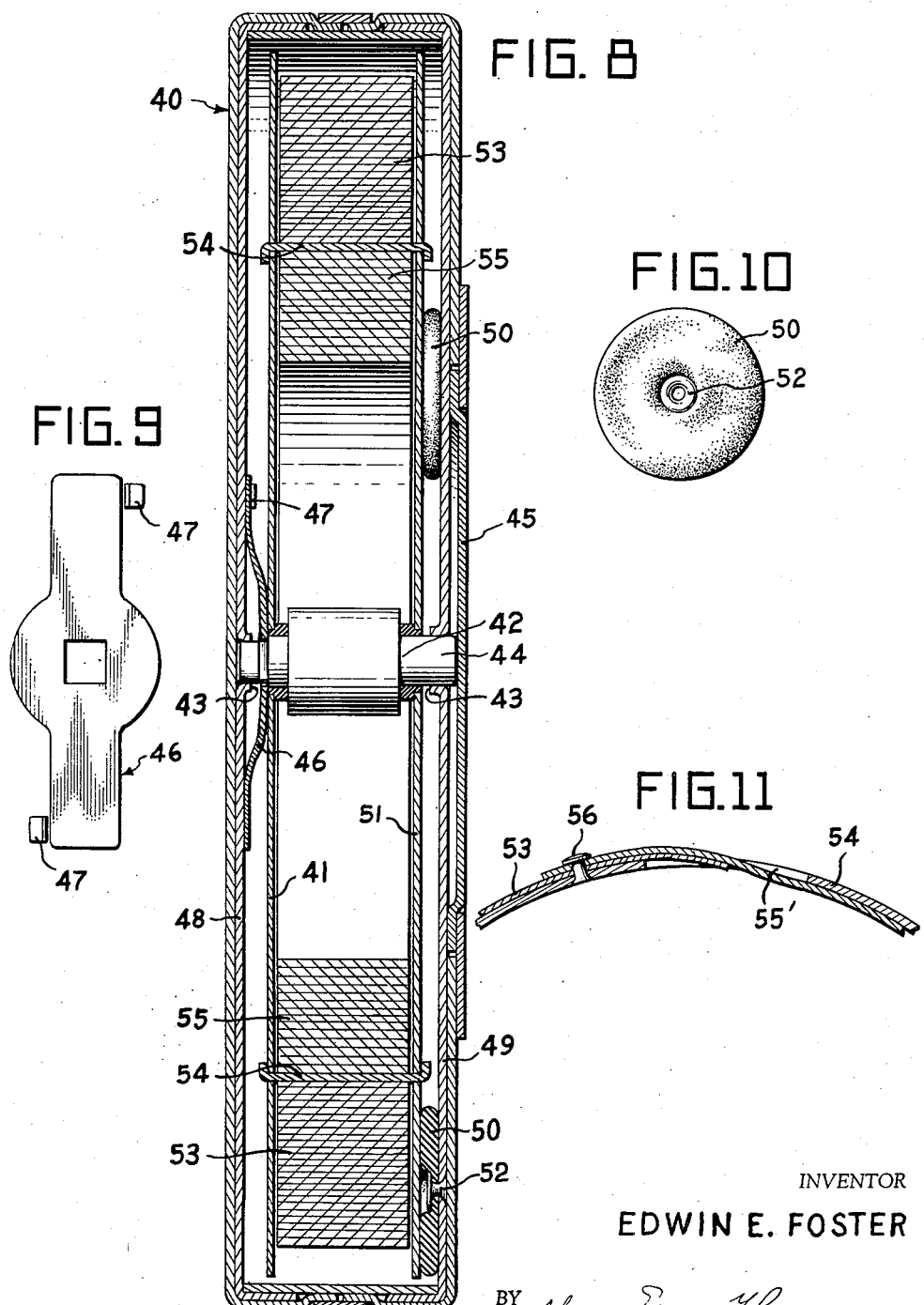
INVENTOR
EDWIN E. FOSTER
BY *Young, Emery & Thompson*
ATTORNEYS United States Patent Office 2,833,534
Patented May 6, 1958

2,833,534

REVERSE WOUND SPRING MOTOR

Edwin E. Foster, Austin, Tex.

Application January 25, 1956, Serial No. 561,971

6 Claims. (Cl. 267—1)

This invention relates to a coiled ribbon spring and spring motor specifically of the type known as a spiral spring. The present application is a continuation-in-part of the co-pending patent application Serial No. 427,835 filed May 5, 1954.

It is an object of the invention to provide an approximately constant tension coiled ribbon spring in which the unwinding force of the spring is substantially constant throughout substantially the entire period of force transmittal as the spring moves from substantially the extreme wound position to substantially the position where the spring is completely unwound. A still further object of the invention is to produce a torsion spring by stressing a ribbon of spring metal so that a longitudinal set is imparted thereto such that said ribbon when unrestrained will take the form of a closely wound coiled spring and then to wind the coil spring in the opposite direction so that the entire length of ribbon becomes effective to expend its force as a substantially constant effort during the entire unwinding or enlarging of the coils of the spring.

Another object of the invention resides in the provision of a ribbon coil spring closely wound in a spiral form so that any segment of the spiral will assume a curvature in which the concave side is directed away from the center of the spiral in contrast with a normal torsion spring in which the concave side faces toward the center. A further object of the invention resides in the provision of means to restrain the spring so that it will always act throughout its entire length during its force movement as a motor.

A still further object of the invention is to provide a spiral spring as a closely wound coil of tempered spring ribbon with the convolutions of the coil wound opposite to a normal coiled spiral spring whereby the entire length of the spring creates the spring force which is substantially constant throughout the force stroke of the spring and any sector of the spiral coil when permitted to assume its normal curvature which is opposite to the first-mentioned coil will have a compressive residual stress on the concave side and a tensile residual stress on the convex side.

Further objects will be apparent from the following description when considered in connection with the accompanying drawings in which like reference characters indicate corresponding parts and in which—

Figure 5:
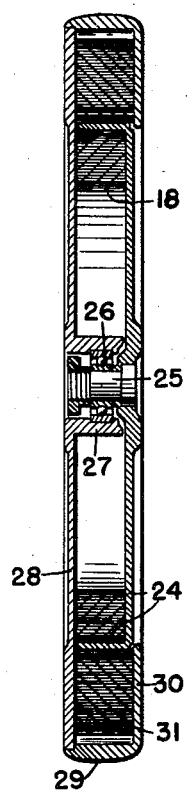
Figure 4:
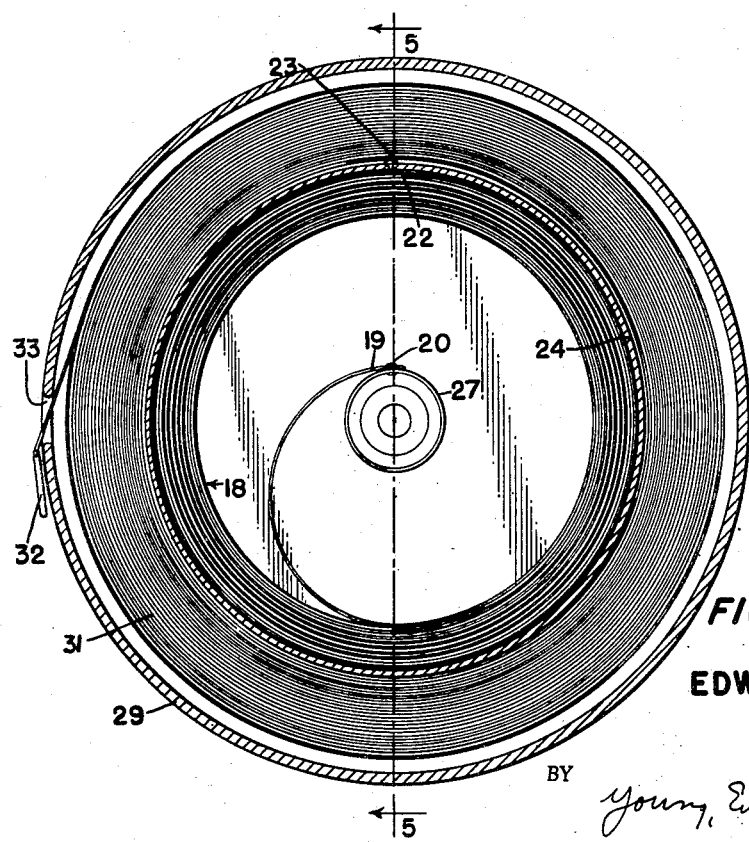

Figure 1 is a side elevation of the coil spring to be wound on its drum,

Fig. 2 is a side elevation partly in section showing the spring wound in position for use, Fig. 3 is a side elevation partly in section similar to Fig. 2 showing the spring in an unwound position, Fig. 4 is a cross section through a measuring tape reel showing the spring in an unwound position, Fig. 5 is a cross section of the reel taken on line 5—5 of Fig. 4, Fig. 6 is a side view partly in section and similar to Figs. 2 and 3 showing the spring approximately one-half unwound, Fig. 7 is a side view partly in section of a modified spring restrainer, Fig. 8 is a cross section through a tape measure reel provided with a brake device, Fig. 9 is a plan view of a leaf spring for the brake device of Fig. 8, Fig. 10 is a plan view of one of the brake pads of Fig. 8, and Fig. 11 is a sectional view of a detail showing the fastening means for one end of the spring and one end of the tape measure on the drum.

The spring according to this application is a new basic spring possessing properties and abilities different from those common to the usual spring forms. In appearance the spring resembles the ordinary spiral power spring. It is capable of a relatively lower torque gradient, longer deflection and higher starting torque than a spiral power spring occupying the same space. The spring may be defined as an elastic device comprised of an element turned inside out, mounted within a restraining case on an arbor, the axes of which coincide. More specifically, the same element comprises a strip of spring metal, each increment of which has been set to naturally assume the shape of a portion of a circle so that if the strip is permitted to coil, each wrap of the coil would be in contact with its adjacent wrap. Preferably the strip of metal is over-stressed in the desired direction as indicated above and then slightly stressed in the opposite direction so as to finally provide the desired curvature in the original direction of stressing and at the same time provide a residual compressive stress on the concave side of the strip and a residual tensile stress on the convex side of the strip. An element of this nature can readily be made employing the method and apparatus disclosed in my U. S. Patent No. 2,609,191 issued September 2, 1952. The tensioning devices disclosed in said patent inherently provide the strip with the desired residual stresses. Elements made following the teaching of Patent No. 2,609,-191 are particularly satisfactory for use in this invention. Similarly, elements made with the tensioning apparatus disclosed in Patent No. 2,609,191 maintained in a single fixed position are satisfactory. In the latter case a tightly coiled spring having all of its increments with the same normal radius of curvature and having the same residual stresses throughout its length would be formed.

To form the spring of this invention, the outer end of a strip formed as described above is fastened to an arbor and then backwound thereon. After such backwinding, the original outer end of the spring element becomes the inner end fastened to the arbor and the original inner end becomes the outer end fastened to the restraining case. In use, the arbor rotates with respect to the restraining case, winding the spring element on the arbor. After a few initial turns of the arbor virtually all of the material reaches approximately the same stress level from end to end.

The high initial stress produced by forcing the spring inside out provides the high starting torque. As angular deflection progresses the torque gradually and steadily increases and the stress throughout the entire material length likewise gradually increases. The favorable residual stressing of the spring material permits much higher working stresses than possible with spiral power springs. These higher allowable working stresses permit use of thinner material and consequently longer length in the same case size. Also, the inherent outward thrust of the material causes a greater percentage of the length to be active throughout angular deflection. The high starting torque, long deflection and increased active length result in the low torque gradient.

Referring now more particularly to Figs. 1 and 2, as stated above the spring shown therein is formed by any method substantially the same as that disclosed in my U. S. Patent No. 2,609,191. The spring 1 is composed of closely wound spiral coils and is in the form of a ribbon of such width and thickness as may be desired depending upon the force of the spring required and its overall size. The spring 1 has an inner end 2 and an outer end 3 and the force of the spring as to the outer coil is in the direction of the arrows 4. The segments 5 indicate the normal coil or curvature for any short length of the coils if cut anywhere from the complete coil and represents the set of the spiral ribbon. In preparing the coil 1 for use in accordance with this invention, the outer end 3 of the spiral is connected to a drum 6 and the latter is turned clockwise in the direction of the arrow 7 which latter shows the winding direction of the ribbon on the spool or drum 6. When completely wound in this direction as shown by coil 8 in Fig. 2, the end 2, which was the inner end of the coil shown in Fig. 1, is now the outer end 9 of the coil 8 and is secured to a pin or rivet 10 in an outer drum or spool 11. In this position of the coil 8 the forces of the spring are directed outwardly as indicated by the arrows 12 which is opposite to the forces in the coil of Fig. 1. The coil 8 is wound on the drum 6 with its end 3 secured at or on pin 13 as indicated. The segments 14 indicate the normal coil of the spring ribbon if cut anywhere from the complete coil and it will be noted that the segments have their concave faces directed way from the center of the coil whereas in Fig. 1 the concave faces of the segments 5 face toward the center of the coil.

In Fig. 2 the spring is completely coiled on the drum 6 and exerts a force on the drum 11 in the direction of the arrow 15. As soon as the drum 6 is permitted to rotate in this direction this force is effective throughout the entire length of the coil 8 from the rivet 10 to the pin 13 since the convolutions of the coil 8 will "open" slightly to a less closely wound position as shown in Fig. 6. As the drum 11 rotates clockwise in the direction of the arrow 15 the coils will finally spirally come to rest against the inside peripheral surface of the drum 11 as shown in Fig. 3 with the force of the spring 8 still directed outwardly as indicated by the arrows 16. In this Fig. 3 the segments 17 cut from the coil will assume the curvature of the normal set coil as indicated.

The spiral spring according to this invention is applicable for many uses and can be used in a great many devices and different kinds of implements, motors, gadgets and toys. For instance the spring is particularly applicable as motors for cameras, clocks, spring devices for toys and other devices, measuring tape reels, various winding and reeling devices, and other machines and devices. As an example, Figs. 4 and 5 show the invention applied to a measuring tape in which the spring coil 18 is connected at the inner end 19 to the hub member 27 at 20 with the outer end 22 connected by pin or rivet 23 to a drum 24. The drum 24 with the spring is rotatably mounted on a pin or bolt 25, Fig. 5, by means of a ball bearing 26 mounted in a hub member 27. The latter is preferably integral with the stationary casing 28 having a rim portion 29 extending around to the other side 30 to the peripheral edge of the drum 24. Thus the members 28, 29 and 30 form a circular chamber to receive a tape 31 of steel, fabric or other suitable material secured at its inner end to the pin 23 and having a wire loop 32 at its outer end. The tape 31 passes through an opening 33 in the peripheral surface 29 of the outer casing. In the position of the parts as shown in Fig. 4 upon pulling out the tape 31 the spring 18 gradually changes its position until the position of Fig. 2 is reached wherein the entire length of the tape is completely pulled out of the casing. During the entire travel of the tape out of the reel casing the return pull to rewind is substantially the same from the position of Fig. 4 to that of Fig. 2. In other words the force of the spring urging rewind of the tape is substantially constant from the position of Fig. 2 to Fig. 4 or throughout the entire force stroke of the spring.

The operation of the spring is believed to be obvious from the description and the drawings. It is of course necessary to restrain the movement of the spring such as by the housing or casing 11 and the pins or points at each end of the spring must be fixed except as to relative circumferential movement of the pins so that one pin or end of the spring rotates relative to the other end. The force of the spring 8 in Fig. 2 acts throughout its entire length from the pin 13 to the pin 10 so that as the tape 31 is pulled out of the casing 28, 29 and 30 the drum 24 rotates so that the spiral turns of the spring will build up around the outer peripheral surface of the drum 6 to the end position as indicated in Fig. 2 in which position the tape is completely out to the end of the measure for which the device is designed.

Fig. 6 shows the spring 8 partially unwound in ultimately reaching the position of Fig. 3 from Fig. 2. Of course, at any point the spring 8 may be permitted to unwind and expand to the position of Figs. 3 and 4 and it will be observed that the coils of the spring in Fig. 6 are practically out of contact with each other.

Fig. 7 shows a modified restraining means for the spring in which the spring 8 has, as usual, its inner end 3 secured to a pin or rivet 13 which latter is mounted in a drum 6. The outer end 9 of the coil 8 is secured on a lug 34 mounted on a pin 35 of which any suitable number are mounted on a disc 36 of which latter there may be two spaced apart to accommodate the spring. Thus in this modification the spring is mounted on and between a pair of plates or disc to keep the spring in place.

In the manufacture of the spring it is possible to form the spring with a constant set or the set may vary throughout the length of the spring, as shown in my U. S. Patent No. 2,609,191. Then the ribbon is wound in reverse direction on a drum to the position of Fig. 2 in which position and condition the spring is complete and ready for use.

It is also possible to reverse wind the ribbon directly into the coil of Fig. 2 as it issues from the setting machine into a coil the reverse of the coil shown in Fig. 7 of the said patent. The spring may also be formed in a longitudinally directed ribbon and then wound in the direction of Fig. 2 without first winding it into a coil of the direction shown in Fig. 1.

The normal set in the spring may be uniform of approximately so, but it is also possible to have a stronger or weaker set at one or both ends of the spring relative to the remaining portion thereof.

Referring now to Figs. 8 to 11 the structure shown in these figures shows a measuring tape provided with a brake to prevent re-winding of the tape when the latter is released, so that re-winding by the spring takes place only when the brake is released by manual force on a part of the casing of the tape. As shown the casing 40 is of any suitable construction housing a reel 41 mounted on a pin or axle 42. This pin 42 is slidably mounted in bearings 43 in the casing as shown in Fig. 8. One end 44 of the pin 42 projects outside of the casing on one side and is covered with a disc 45 which may flex so that the disc may be slightly pressed inwardly to cause axial movement of the reel 41 against the force of a return leaf spring 46, the latter being mounted in bowed relationship to bear with its ends against the casing 40 and its center portion against the reel 41. To prevent rotation of the spring 46 a pair of lugs or stops 47 are provided on or stamped from the side 48 of the casing 40.

On the internal surface of the other side 49 of the casing 40 there are provided a plurality of pads 50 spaced in a circumferential manner approximately 120° from each other and being adapted to be contacted by the side 51 of the reel 41. Each pad 50 may be secured by one or more rivets 52.

The reel has the measuring tape 53 wound around the drum 54 and within the reel there is provided the spring ribbon 55 which is a reverse wound pre-stressed spiral spring. The spring 55 may be secured in the reel as shown in Fig. 11 in which the drum 54 has an opening 55' therein through which the outer end of the spring ribbon passes and is secured by means of a rivet 56, as shown.

In operation the tape 53 may be pulled out from the casing 40 and when the tape is out of the casing the frictional contact of the pads on the side 51 of the reel as forced by the spring 46, will prevent the re-coiling of the tape due to the force in the spring 55. When the tape is to be wound back on the reel the plate 45 is pressed with slight force to overcome the force of the spring 46, so that when the side 51 is out of contact with the pads 50, the reel is free to rewind the tape back thereon.

I claim as my invention:

1. A spiral spring comprising a coil of spring ribbon with the convolutions of the coil wound opposite to a normal coiled spiral spring whereby substantially the entire length of the spring creates the spring force which is substantially constant throughout the force stroke of the spring, said ribbon having been stressed initially so that any sector of the spiral coil when permitted to assume its normal curvature which is opposite to the first-mentioned coil will have a longitudinal compressive residual stress on the concave side and a longitudinal tensile residual stress on the convex side.

2. A spiral spring comprising a coil of spring ribbon composed from an initially coiled spiral spring of which the convolutions are tightly wound and adjacent to each other, the convolutions of said coil of spring ribbon being wound opposite to said initially coiled spiral spring whereby substantially the entire length of said coil of spring ribbon creates the spring force which is substantially constant throughout the force stroke of the spring said ribbon having been stressed initially so that any sector of said coil of spring ribbon, when permitted to assume its normal curvature which is opposite to the first-mentioned coil will have a longitudinal compressive residual stress on the concave side and a longitudinal tensile residual stress on the convex side.

3. A spiral spring comprising a coil of spring ribbon with the convolutions of the coil wound opposite to the normal set of said ribbon whereby substantially the entire length of the spring creates the spring force which is substantially constant throughout the force stroke of the spring, said ribbon having been stressed initially so that any sector of the spiral coil when permitted to assume its normal curvature which is opposite to the first-mentioned coil will have a longitudinal compressive residual stress on the concave side and a longitudinal tensile residual stress on the convex side, and a pair of concentrically and rotatably mounted restraining members for the coil of spring ribbon with one end of the ribbon connected to one member and the other end of the ribbon connected to the other member.

4. A spiral spring comprising a coil of spring ribbon with the convolutions of the coil wound opposite to the normal set of said ribbon whereby substantially the entire length of the spring creates the spring force which is substantially constant throughout the force stroke of the spring, said ribbon having been stressed initially so that any sector of the spiral coil when permitted to assume its normal curvature which is opposite to the first-mentioned coil will have a longitudinal compressive residual stress on the concave side and a longitudinal tensile residual stress on the convex side, and a pair of concentric relatively rotatable drums for the coil of spring ribbon with the outer end of the ribbon connected to the internal surface of the outer drum and the inner end of the ribbon connected to the outer surface of the inner drum.

5. A spiral spring comprising a coil of spring ribbon with the convolutions of the coil wound opposite to the normal set of said ribbon whereby substantially the entire length of the spring creates the spring force which is substantially constant throughout the force stroke of the spring, said ribbon having been stressed initially so that any sector of the spiral coil when permitted to assume its normal curvature which is opposite to the first-mentioned coil will have a longitudinal compressive residual stress on the concave side and a longitudinal tensile residual stress on the convex side, and outer and inner drums concentrically arranged with the smaller inner drum rotatably securd to the larger outer drum whereby the ends of the coil ribbon are secured to the inner and outer drums.

6. A spiral spring comprising a coil of spring ribbon with the convolutions of the coil wound opposite to the normal set of said ribbon, said ribbon having been stressed initially so that any sector of the spiral coil when permitted to assume its normal curvature which is opposite to the first-mentioned coil will have a longitudinal compressive residual stress on the concave side and a longitudinal tensile residual stress on the convex side.

References Cited in the file of this patent

UNITED STATES PATENTS

| | | |
|---|---|---|
| 2,063,799 | Fornelius | Dec. 8, 1936 |
| 2,599,320 | Dart | June 3, 1952 |
| 2,609,191 | Foster | Sept. 2, 1952 |
| 2,609,192 | Lermont | Sept. 2, 1952 |
| 2,622,700 | Geyer | Dec. 23, 1952 |
| 2,636,694 | Evans | Apr. 28, 1953 |
| 2,647,743 | Cook | Aug. 4, 1953 |
| 2,673,694 | Howell | Mar. 30, 1954 |